United States Patent [19]

Sato et al.

[11] Patent Number: 5,787,419
[45] Date of Patent: Jul. 28, 1998

[54] FACE IMAGE SEARCHING APPARATUS FOR SEARCHING FOR AND DISPLAYING A FACE IMAGE

[75] Inventors: Shinichiro Sato, Fussa; Kyoko Maeda, Hinodemachi; Kenji Chida, Kawaguchi; Takashi Kojo, Ome, all of Japan

[73] Assignee: Casio Computer Co., Ltd., Tokyo, Japan

[21] Appl. No.: 757,141

[22] Filed: Dec. 3, 1996

Related U.S. Application Data

[63] Continuation of Ser. No. 94,469, Jul. 19, 1993, abandoned.

[30] Foreign Application Priority Data

Aug. 24, 1992 [JP] Japan .................................. 4-224240
Aug. 24, 1992 [JP] Japan .................................. 4-224241
Dec. 17, 1992 [JP] Japan .................................. 4-337351

[51] Int. Cl.$^6$ .................................................. G06F 17/30
[52] U.S. Cl. ............................. 707/4; 707/104; 345/435
[58] Field of Search .......................... 395/600, 12, 133,
395/147, 154, 155, 161; 345/113, 114,
433, 435; 382/118; 705/27; 707/1, 2, 4,
5, 104

[56] References Cited

U.S. PATENT DOCUMENTS

| | | | |
|---|---|---|---|
| 5,012,522 | 4/1991 | Lambert | 382/2 |
| 5,148,522 | 9/1992 | Okazaki | 395/161 |
| 5,157,783 | 10/1992 | Anderson et al. | 395/600 |
| 5,179,652 | 1/1993 | Rozmanith et al. | 395/155 |
| 5,247,610 | 9/1993 | Oshima et al. | 395/135 |
| 5,319,745 | 6/1994 | Vinsonneau et al. | 395/144 |
| 5,375,195 | 12/1994 | Johnston | 395/135 |
| 5,383,111 | 1/1995 | Homma et al. | 364/401 |
| 5,400,436 | 3/1995 | Nara et al. | 395/13 |
| 5,404,295 | 4/1995 | Katz et al. | 364/419.19 |
| 5,404,435 | 4/1995 | Rosenbaum | 395/147 |
| 5,450,580 | 9/1995 | Takada | 395/600 |

FOREIGN PATENT DOCUMENTS

| 0283267 | 9/1988 | European Pat. Off. |
|---|---|---|
| 3-129572 | 6/1991 | Japan . |

OTHER PUBLICATIONS

IBM Nachrichten, vol. 34, No. 272, Aug. 1984, Germany, pp. 41–44, H. Zima, Contruction on a Display; Physiognomy..

IEEE Workshop On Languages for Automation, Aug. 29, 1988, U.S., pp. 149–154, T. Hamano "A Similarity Retrieval Method for Image Databases using simple Graphics".

*Primary Examiner*—Paul R. Lintz
*Assistant Examiner*—Maria N. Von Buhr
*Attorney, Agent, or Firm*—Frishauf, Holtz, Goodman, Langer & Chick

[57] ABSTRACT

A data search apparatus is capable of searching for a face image, character data corresponding to the face image, and/or a combination of the face data and character data, based only on part of the data which compose the face image. In such case, one or more part data, such as eyes, nose, etc. composing the face image is designated by a key input unit, and image data including part data which coincides with the designated part data, is read out from memory. The found face image is then displayed on a display unit, along with character data corresponding thereto.

1 Claim, 15 Drawing Sheets

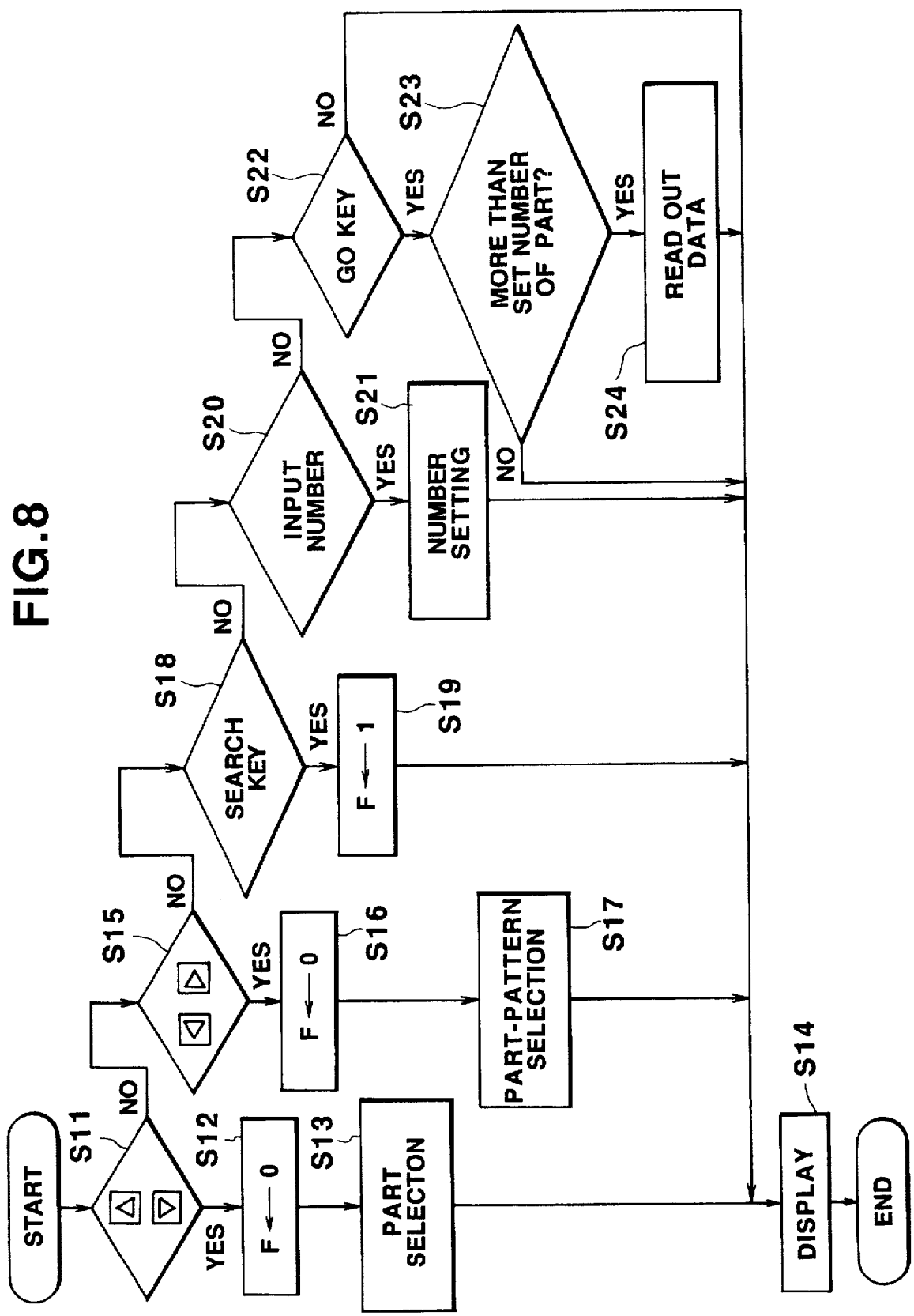

FIG.11

| | |
|---|---|
| 0 | NAME : ICHIRO SUZUKI  F<br>ADD. : ···TOKYO<br>AGE : 36  SEX : MALE<br>BLOOD TYPE : B<br>PART NO. : ①-1, ②-1,<br>③-2, ④-17,··· |
| 1 | NAME : HIROSHI YAMAMOTO  F<br>ADD. : ···SAITAMA<br>AGE : 24  SEX : MALE<br>BLOOD TYPE : A<br>PART NO. : ①-10, ②-7,<br>③-4, ④-6,··· |
| 2 | NAME : MASAKO OHBAYASHI  F<br>ADD. : ···CHIBA<br>AGE : 28  SEX : FEMALE |

FACE IMAGE SEARCHING APPARATUS FOR SEARCHING FOR AND DISPLAYING A FACE IMAGE

This application is a continuation of application Ser. No. 08/094,469, filed Jul. 19, 1993, now abandoned.

BACKGROUND OF THE INVENTION

1. Field of the Invention

The present invention relates to a data searching apparatus which is capable of searching a combined data from among a plurality of combined data and/or character data corresponding to the combined data.

2. Description of the Related Art

Conventionally, a data searching apparatus has been known, in which a number of personal data such as names, addresses, and phone numbers have been memorized, personal data is searched through the previously memorized personal data with respect to an externally inputted name or phone number, and the searched personal data is displayed in an electronic manner.

In such a conventional data searching apparatus, a name or an address of a person to be searched is inputted to search personal data of the person, and the personal data of the person including such data that coincide with the inputted name or address is retrieved and displayed. But the conventional data searching apparatus has a drawback that if a user of the data searching apparatus should forget key data such as a name and/or address of the person to be searched, it is almost impossible for the user to search the personal data he (or she) wants even though he should have in mind an image of a face of the person.

SUMMARY OF THE INVENTION

The present invention has been made to overcome the drawback of the prior art apparatus. One object of the present invention is to provide a data searching apparatus which permits the user to instantly and easily search combined data that he (or she) wants from among a plurality of combined data and/or character data corresponding to the combined data.

According to one aspect of the present invention, there is provided a data searching apparatus which comprises:

- combined data storing means for storing a plurality of combined data, each of which includes a combination of plural part data, each part data representing a portion of an object;
- designating means for designating at least one of the plural part data;
- comparing means for judging whether part data designated by said designating means coincides with anyone of part data included in the plurality of combined data stored in said combined data storing means, and for outputting a coincidence signal when the part data designated by said designating means coincides with one of the part data included in the combined data; and
- combined data reading means for reading out combined data from said combine data storing means, which combined data includes the part data that coincides with part data included in the combined data stored in said combined data storing means, when said comparing means outputs the coincidence signal.

It is preferable that the data searching apparatus according to the present invention further comprises display means for displaying combined data read out by the combined data reading means.

Further, it is preferable that the data searching apparatus of the present invention further comprises character data storing means for storing character data which correspond respectively to the plurality of combined data stored in the combined data storing means, and wherein the combined data reading means includes character data reading means for reading out character data from the character data storing means, when the comparing means outputs the coincidence signal, which character data corresponds to combined data that includes part data coinciding with the part data included in the combined data stored in said combined data storing means. The combined data stored in the combined data storing means represents an image of a human face, and the part data represents a portion of the human face such as eyes, a nose, a mouth, an outline, a hair style and so on.

It is preferable that the data searching apparatus according to the invention further comprises part-pattern data storing means for storing a number of part-pattern data, each of which represents a figure of a portion of a human face such as eyes, a nose, a mouth, an outline, a hair style and so on, and wherein the part data is data (designating data) used for designating one of part-pattern data stored in said part-pattern data storing means. The above designating data is numeral data for designating one of part-pattern data stored in said part-pattern data storing means.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which:

FIG. 8 is a flow chart of a montage searching process of the second embodiment of the present invention;

FIG. 11 is a view showing by way of example contents of a RAM for storing personal data and montage data;

DESCRIPTION OF PREFERRED EMBODIMENTS

Now, preferred embodiments of the present invention will be described in detail with reference to the accompanying drawings.

FIRST EMBODIMENT

Figure 1:
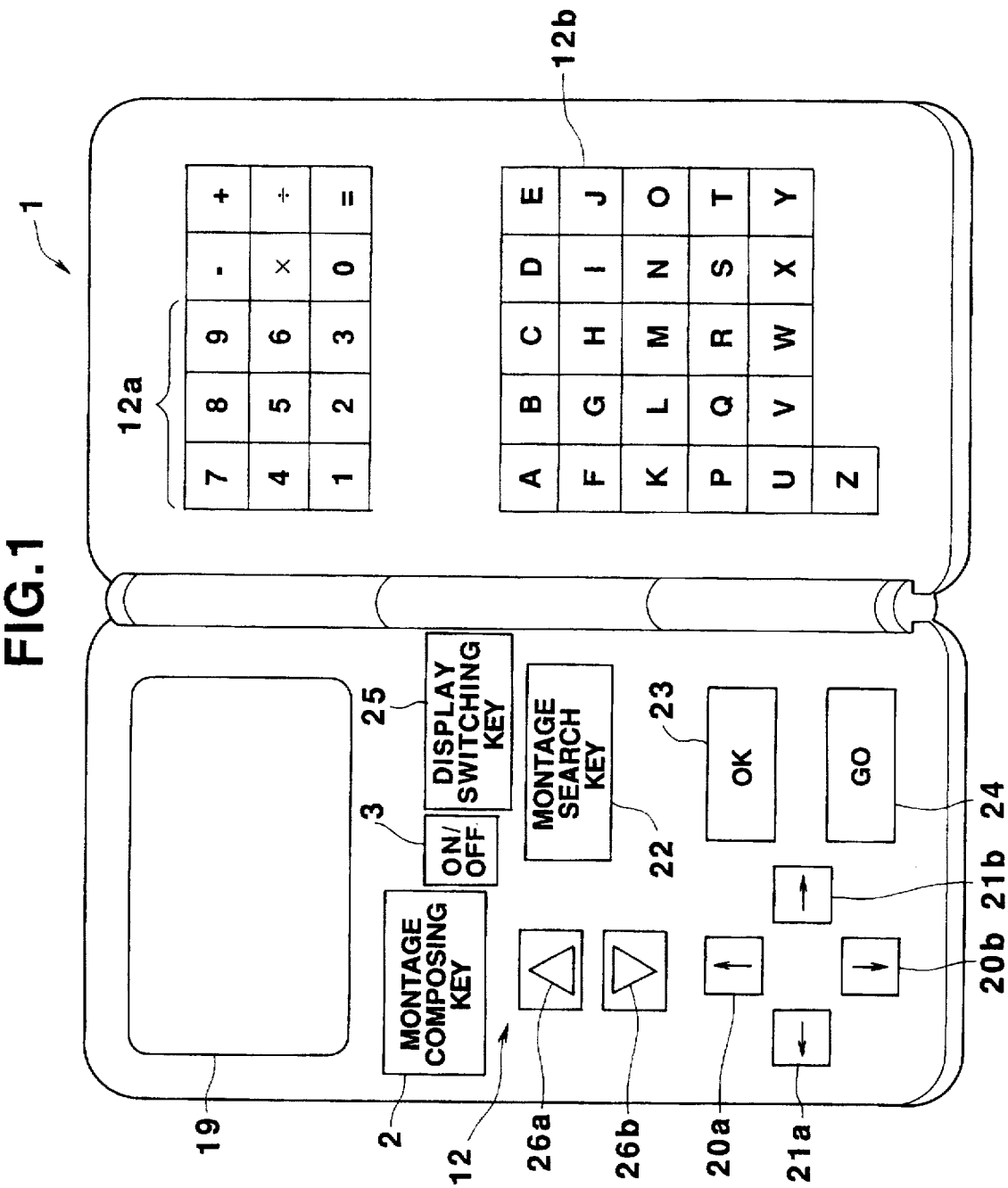
FIG. 1 is a view showing an external appearance of a first embodiment of data searching apparatus according to the present invention.
Figure 2:
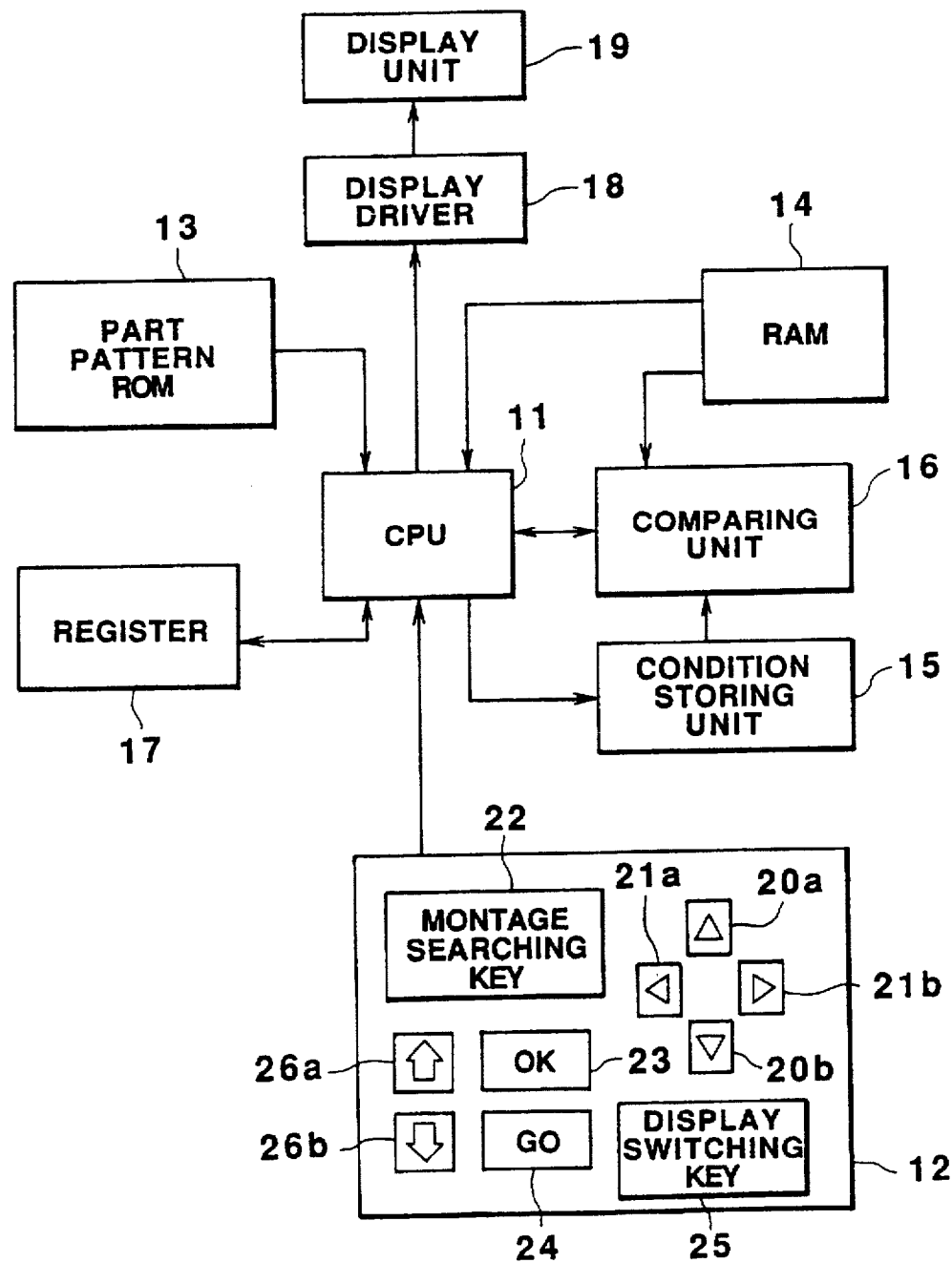
FIG. 2 is a block diagram showing a circuit construction employed in the data searching apparatus of FIG. 1.

FIG. 1 is a view showing an external appearance of an electronic note book incorporating the data searching apparatus according to the present invention, and FIG. 2 is a block diagram showing an electronic circuit employed in the electronic note book.

The electronic note book 1 incorporating the data searching apparatus, shown in FIG. 1, is provided with a central processing unit (CPU) 11 shown in FIG. 2. Upon receipt of a key operation signal from a key input unit 12, the CPU 11 controls operations of peripheral circuits in accordance with a program previously stored in the CPU 11. In addition to the key input unit 11, the CPU 11 is connected with a part pattern ROM 13, a RAM 14, a condition storing unit 15, a comparing unit 16 and a register 17. Further, the CPU 11 is connected with a display unit 19 through a display driver 18. The display unit 19 has a liquid crystal dot matrix display device.

The key input unit 12 is provided with numerical keys 12a, alphabetical keys 12b, Hiragana keys (Japanese keys, not shown), a power switch (an ON/OFF key) 3, a montage composing key 2, part selecting keys 20a and 20b, and part pattern selecting keys 21a and 21b. The numerical keys 12a, the alphabetical keys 12b and the Hiragana keys are used to enter personal data such as a name, an address and a phone number. The montage composing key 2 is operated when montage data is entered to compose a montage. In a montage composing mode set by operation of the montage composing key 2, the part selecting keys 20a and 20b are used to select a part of a human face such as a hair style, eyes, a nose and a mouth. Further, the part pattern selecting keys 21a and 21b are used to select part-pattern data of the respective parts of the human face.

Furthermore, the key input unit 12 is provided with various function keys such as a montage searching key 22 used for searching for montage data, an OK key 23, a GO key 24, a display switching key 25 and search-data selecting keys 26a and 26b. The OK key 23 is operated to set a search condition for searching for part-pattern data selected by the part-pattern selecting keys 21a and 21b. The GO key 24 is operated to execute a montage searching process based on the part-pattern data which is set by operation of the OK key 23 to be searched for. The display switching key 25 is operated to switch data to be displayed. The search-data selecting keys 26a and 26b are operated to select data to be searched for.

Figure 3:
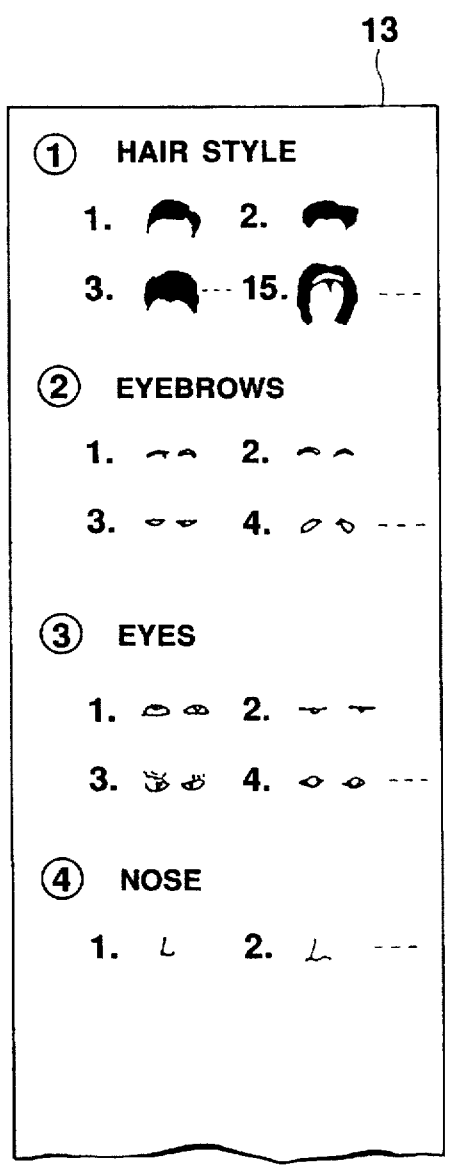
FIG. 3 is a view showing contents of a part-pattern ROM.
Figure 4:
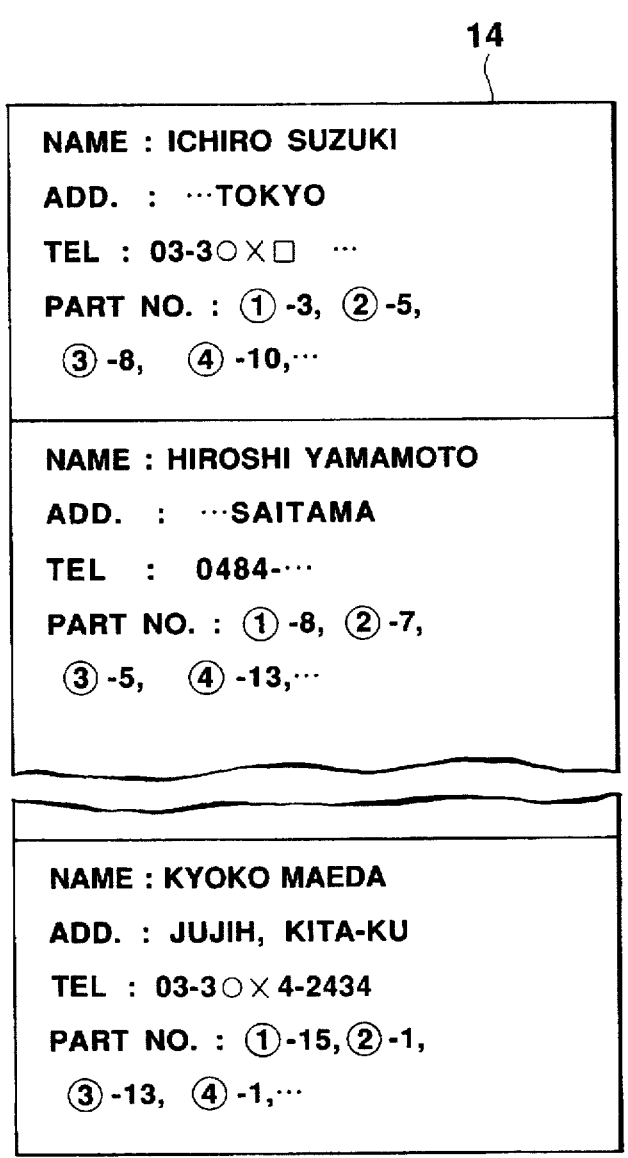
FIG. 4 is a view showing by way of example contents of a RAM for storing personal data and montage data.

Part-pattern data represent patterns of face-parts composing a human face such as a hair style, eyebrows, eyes, a nose, a mouth and so on. At predetermined memory areas in the part-pattern ROM 13 are stored plural sorts of part-pattern data of each face-part with reference numbers added in a bit map data format, as shown in FIG. 3. In the present first embodiment, for example, a part-pattern data of the hair style of "hair parted at the side" is stored at an area of No. 1 of an address of No. 1, and a part-pattern data of the hair style of "hair parted normally" is stored at an area of No. 2 of the address of No. 1. Similarly, at an area of No. 1 of an address of No. 2 is stored a part-pattern data of eyebrows of "thick arched eyebrows" in the bit map data format, and at an area of No. 2 of the address of No. 2 is stored a part-pattern data of eyebrows of "thin arched eyebrows" in the bit map data format.

The RAM 14 is arranged to store a plurality of combination data including personal data of a person and his (or her) montage data, which personal data includes character data such as a name, an address and a phone number, and which montage data represents an image of a face of the person. The montage data is a combination of part data corresponding respectively to face parts such as a hair style, eyebrows, eyes, a nose and a mouth of a human face. In the present first embodiment, each montage data is comprised of a combination of part numbers and part-pattern numbers, the part numbers which represent face parts composing a human face of a certain person, and the part-pattern numbers which represent part-pattern data stored in the part-pattern ROM 13.

The condition storing unit 15 serves to store part-pattern numbers representative of part-pattern data of face parts which are set in a montage searching mode to be searched for. In this case, an arbitrary number of face parts may be set as to be searched for.

In the montage searching mode, the comparing unit 16 compares the part-pattern number stored in the condition storing unit 15 with all the part-pattern numbers included in montage data stored in the RAM 14, and outputs a coincidence signal to the CPU 11 when it is judged that the former part-pattern number coincides with anyone of the latter part-pattern numbers included in the montage data (hereafter, the part-pattern number which coincides with one of the part-pattern numbers included in the montage data is referred to as a coincident part-pattern number).

When the coincidence signal is outputted from the comparing unit 16, all the part-pattern numbers of face parts included in montage data which includes the coincident part-pattern number are read out from the RAM 14 to the CPU 11, and are set to the register 17.

The display driver 18 drives the display unit 19 based on display data sent from the CPU 11. More particularly, the part-pattern data corresponding to the part-pattern number of each of the face-parts is read out from the part-pattern ROM 13, and the read out part-pattern data are combined to compose a montage. The montage comprised of the combined part-pattern data is displayed through the display driver 18 on the display unit 19.

Now, operation of the first embodiment with the above structure will be described.

Figure 5:
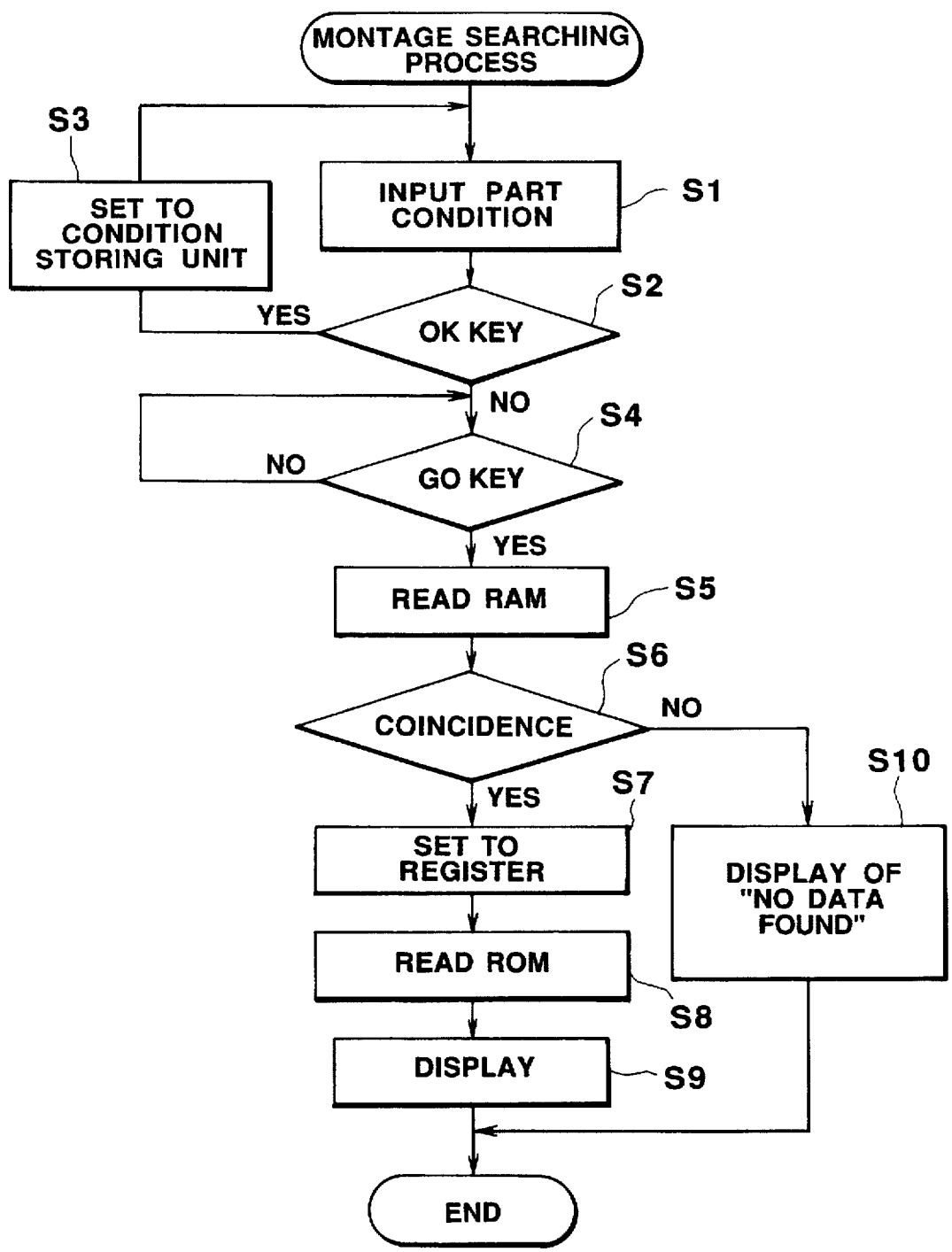
FIG. 5 is a flow chart of a montage searching process of the first embodiment of the present invention.

FIG. 5 is a flow chart of the montage searching process executed in the first embodiment. FIGS. 6A to 6H are views illustrating conditions set in the montage searching process and indications displayed in the same process.

Figure 6A:
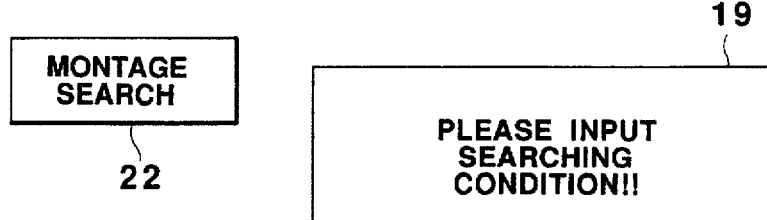
FIGS. 6A to 6H are views illustrating conditions set in the montage searching process and indications displayed in the same process.
Figure 6B:
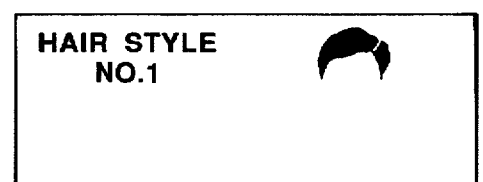
Figure 6C:
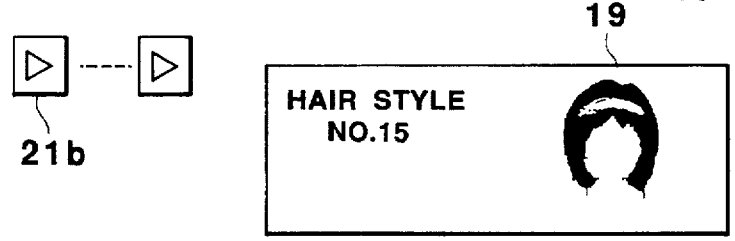
Figure 6D:
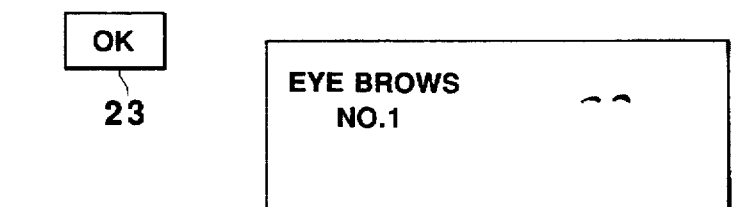
Figure 6E:
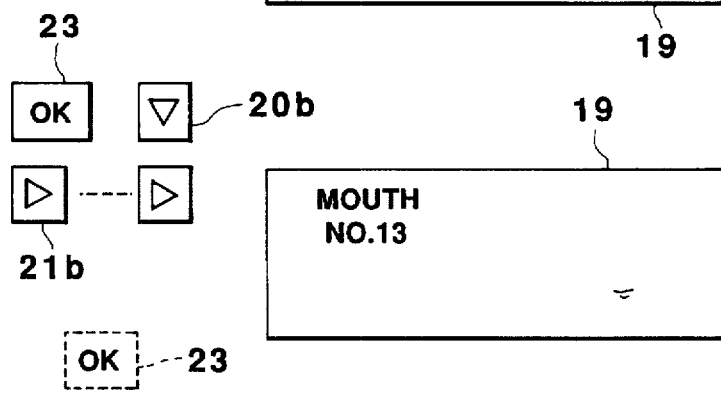
Figure 6F:
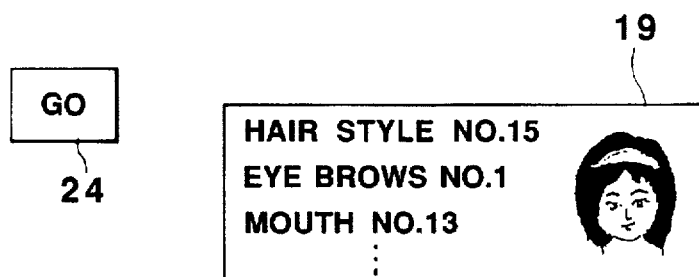
Figure 6G:
Figure 6H:
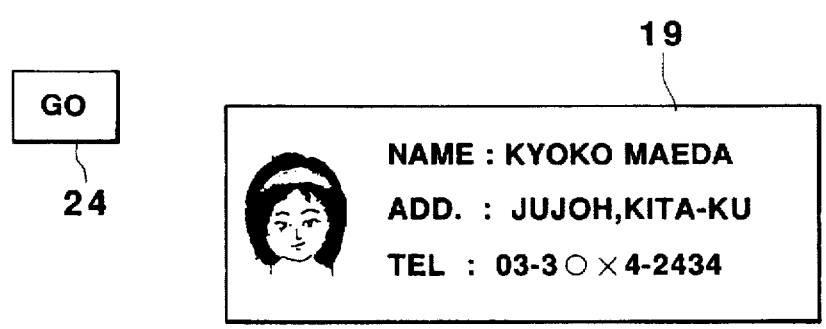

Referring to FIG. 5 to FIG. 6G, operation will be described which reads out under searching conditions personal data of a certain person from among personal data which have been previously stored as data base in the RAM 14, and displays the read out personal data on the display unit 19.

At first, the CPU 11 is set to the montage searching mode by operation of the montage searching key 22 of the key input section 12.

Then, as shown in FIG. 6A, a massage of "Please, input searching conditions !!" stored in a memory unit (not shown) within the CPU 11 is read out and displayed through the display driver 18 on the display unit 19, for example, for two seconds. Thereafter, a first part-pattern data ("hair parted at the side") of a first face part (in this case, a hair style) stored in the part-pattern ROM 13 is displayed to be input as a searching condition, as shown in FIG. 6B.

A user operates the part-pattern selecting key 21b of the key input unit 12 to select a part-pattern data from among a plurality of part-pattern data of the hair style as shown in FIG. 6B, the part-pattern data which seems to look like a hair style of a person to be searched. When the OK key 23 is operated after a desired part-pattern data of the hair style is selected and displayed on the display unit 19, the part-pattern number (No. 15) of the hair style displayed on the display unit 19 is set to the condition storing unit 15. At the same time, a first part-pattern data of a second face part (in this case, eyebrows) stored in the part-pattern ROM 13 is displayed to be input as a searching condition, as shown in FIG. 6D (steps S1 to S3 of the flow chart of FIG. 5).

When the OK key 23 is operated again, the part-pattern number (No. 1) of the eyebrows displayed on the display unit 19 is set to the condition storing unit 15, and a first part-pattern data of a third face part (in this case, eyes) is displayed to be input as a searching condition. In this time, when the part selecting key 20b is operated to removing "eyes" and "nose" from the searching conditions, a part-pattern data of "mouth" is displayed as a following searching condition, as shown in FIG. 6E.

When the user operates the part-pattern selecting key 21b to make a display of a part-pattern data of the mouth which seems to look like a mouth of the person to be searched and then operates the OK key 23, a part-pattern number (No. 13) of the mouth displayed on the display unit 19 is set to the condition storing unit 15 (steps S1 to S3 of the flow chart of FIG. 5).

When the user operates the GO key 24, as shown in FIG. 6F, with part-pattern numbers, for example, No. 15 for the hair style, No. 1 for the eyebrows and No. 13 for the mouth, set in the condition storing unit 15, the montage searching process is executed under the searching conditions set in this manner, and all the part-pattern numbers composing the montage are successively read out from among the personal data stored in the RAM 14, and are sent to the comparing unit 16. The part-pattern numbers sent to the comparing unit 16 are compared with each of the part-pattern numbers set in the condition storing unit 15 (steps S4 to S6 of the flow chart of FIG. 5).

When the coincidence signal is sent from the comparing unit 16, all montage data are searched for which include at least part-pattern numbers that coincide with the three part-pattern numbers stored in the condition storing unit 15. Then, all the part-pattern numbers composing searched montages are read out from the RAM 14 and are set to register 17. Thereafter, part-pattern data of respective face parts corresponding to the part-pattern numbers set to the register 17 are read out from the part-pattern ROM 13, and are combined in the CPU 11 (steps S6 to S8 of the flow chart of FIG. 5).

Then, the relevant face parts, the part-pattern numbers and a montage of a face to be searched for in accordance with the searching conditions are displayed through the display driver 18 on the display unit 19 as shown in FIG. 6F (step S9).

When the display switching key 25 is operated with the face montage of the person displayed, personal data (name, address, phone number) of the person are read out from the RAM 14 and are displayed on the display unit 19 as shown in FIG. 6G. In the case that there are plural montage data including part-pattern numbers which coincide with the part-pattern numbers stored as searching conditions in the condition storing unit 15, an arbitrary one may be selected from among the plural montage data by operation of the search data selecting keys 26a and 26b, and the selected montage data is displayed.

Meanwhile, in the case that the comparing unit 16 outputs no coincidence signal and there is no montage data which meets the searching conditions, a previously stored message of "No corresponding data is found" is displayed on the display unit 19 (steps S6 to S10).

As described above, with the structure of the first embodiment, some part-pattern data representing features of a person to be searched for are selectively read out from the part-pattern ROM 13 by operation of the key input unit 12 and are displayed on the display unit 19. The part-pattern numbers of the read out part-pattern data are stored in the condition storing unit 15. Then, montage data which includes a part-pattern number that coincides with the part-pattern number stored in the condition storing unit 15 may be read out from the RAM 14 when the comparing unit 16 outputs the coincidence signal. Part-pattern numbers included in the read out montage data are set to the register 17. At the same time, part-pattern data corresponding to the part-pattern numbers set to the register 17 are read out from the part-pattern ROM 13, and are combined by the CPU 11 to compose a montage on the display unit 19. Based on the displayed montage of the person to be searched for, the personal data of the person may be read out from the RAM 14, and displayed on the display unit 19. As described above, if the user has in mind features of the face of a person he (she) wants, the personal data of the person may be instantly and easily searched and displayed on the display unit 19 in accordance with the montage data as searching conditions even though he has forgotten key data for a search such as the name and address of the person.

In the above described first embodiment of the invention, only the montage of the person to be searched for is displayed together with the relevant face parts and part-pattern numbers by operation of the GO key 24 as shown in FIG. 6F, and then, upon operation of the display switching key 25, the personal data (a name, an address, a phone number and so on) of the person whose montage is on display may be read out from the RAM 14 and displayed on the display unit 19. But the data searching apparatus may be arranged such that, upon operation of the GO key 24, both the montage and personal data (a name, an address, a phone number and so on) of the person are simultaneously displayed or only the personal data are displayed on the display unit 19 in place of the montage.

SECOND EMBODIMENT

Now, a second embodiment of the present invention will be described in detail.

In the second embodiment, when part-pattern data are selected which correspond to portions composing a montage of a person to be searched for, montage data including more than part-pattern data which coincide with the selected part-pattern data are searched to compose and display a montage.

Figure 7:
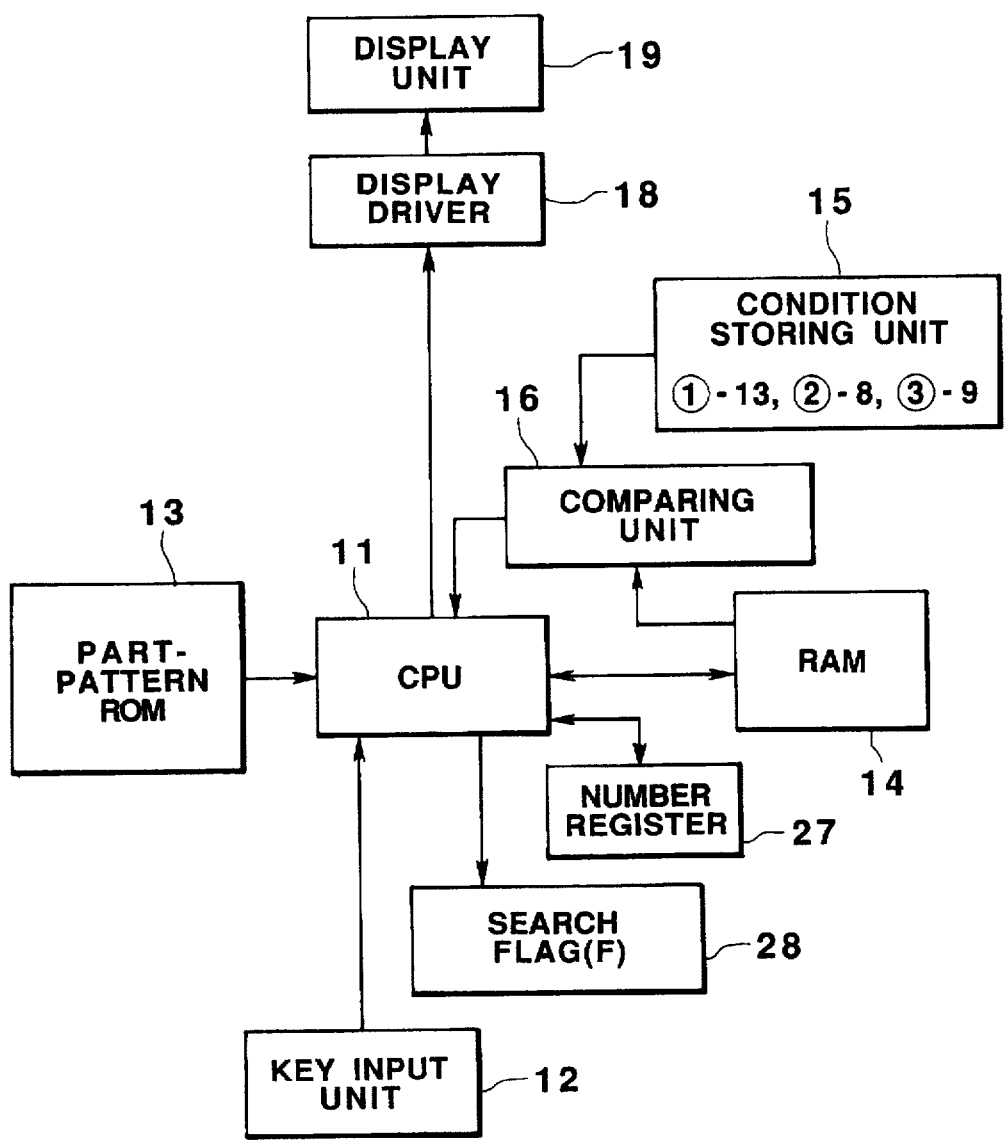
FIG. 7 is a block diagram showing a circuit construction employed in a second embodiment of the present invention.

FIG. 7 is a block diagram of an electronic circuit employed in an electronic note book with a data searching apparatus according to the second embodiment of the present invention. In the present embodiment, like reference numbers represent like elements of the first embodiment and a further description thereof will be omitted.

The present data searching apparatus is provided with a CPU 11. In a similar way as described above with respect to the first embodiment, the CPU 11 is connected with a key input unit 12, a part-pattern ROM 13, a RAM 14, a condition storing unit 15, a comparing unit 16, a display driver 18 and display unit 19, and is further connected with a number register 27 and a search flag register 28.

The key input unit 12 is provided with a montage composing key 2, part selecting keys 20a and 20b, part-pattern selecting keys 21a and 21b, a montage searching key 22, and a GO key 24 for executing a montage searching process. Further, the key input unit 12 is provided with various function keys such an OK key 23, and search-data selecting keys 26a and 26b. In a montage searching mode set by the montage searching key 22, the OK key 23 is operated to set the number of part-pattern data (coincident part-pattern data) selected for a search which part-pattern data coincide with montage part-pattern data registered as a montage by operation of the part-pattern selecting key 21a and 21b. When a plurality of montage data which include coincident part-pattern data have been found in the montage searching mode, the search-data selecting keys 26a and 26b are operated to select one montage data from among the plurality of montage data.

The number of part-pattern data is set by operation of the numeral keys 12a, which part-pattern data are required to coincide with part-pattern data composing montage data previously registered in the RAM 14. Further, the number of the part-pattern data is stored in the number register 27 which features the second embodiment is stored.

The comparing unit 16 outputs a coincidence signal when the part-pattern number for a search coincides with a part-pattern number corresponding to part-pattern data included in a montage data stored in the RAM 14. When the number of the coincidence signals output by the comparing unit 16 exceeds the number (for example, three) of the coincident part-pattern data in the same montage data, the number which has been registered in the number register 27, all the part-pattern numbers of part-pattern data composing the montage data which include coincident part-pattern numbers are read out from the RAM 14 by the CPU 11.

The comparing unit 16 may be arranged to output one coincidence signal when more than a predetermined number of the part-pattern numbers for a search coincide with part-pattern numbers corresponding to part-pattern data included in a montage data stored in the RAM 14.

To the search flag register 28 is set a flag when the montage searching mode is set by operation of the montage searching key 22.

FIG. 8 is a flow chart of the montage searching process executed in the second embodiment. FIGS. 9A to 9D are views showing indications displayed on the display unit 19 during the montage searching process.

Figure 9A:
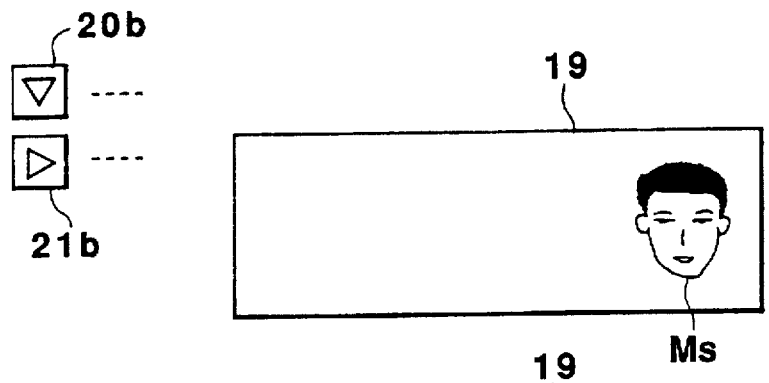
FIGS. 9A to 9D are views illustrating conditions set in the montage searching process of the second embodiment and indications displayed in the same process.
Figure 9B:
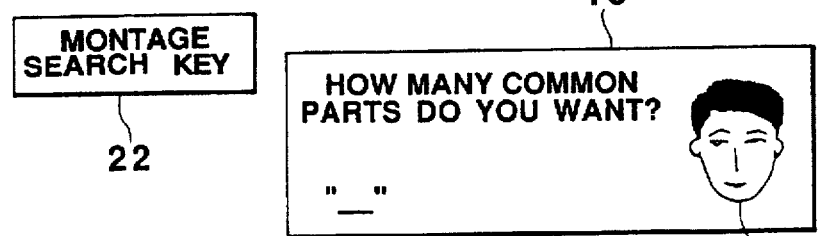

Similarly, personal data are previously stored as data base in the RAM 14. When personal data of a person is required to be read out from the RAM 14 in accordance with the montage of the person, the montage composing mode is set by operation of the montage key 2. In the montage composing mode, a montage Ms of a face to be used for a search is composed by using the part selecting keys 20a, 20b and the part-pattern selecting keys 21a, 21b, and the composed montage is displayed, as shown in FIG. 9A (steps S11 to S17 of the flow chart of FIG. 8). The, part-pattern numbers corresponding respectively to part-pattern data of portions composing the displayed montage of a face are stored and held in the condition storing unit 15.

When the montage search key 22 is operated with the part-pattern numbers for a search stored and held in the condition storing unit 15, the montage searching mode is set, and a flag is set to the search flag register 28. Then, a message of "How many common parts do you want?" is display together with the montage Ms and an indicating cursor, requesting the user to input the number of common part-pattern numbers between the part-pattern numbers for a search and the part-pattern numbers included in the previously registered montage data (steps S18, S19 to S14).

When a number "4" is entered by the numeral keys 12a and the OK key 23 is operated to indicate that the montage Ms and the number to be used for a search have been entered, the number "4" is set to the number register 27 and is displayed on the indicating cursor (steps S20, S21 to S14).

Figure 9C:
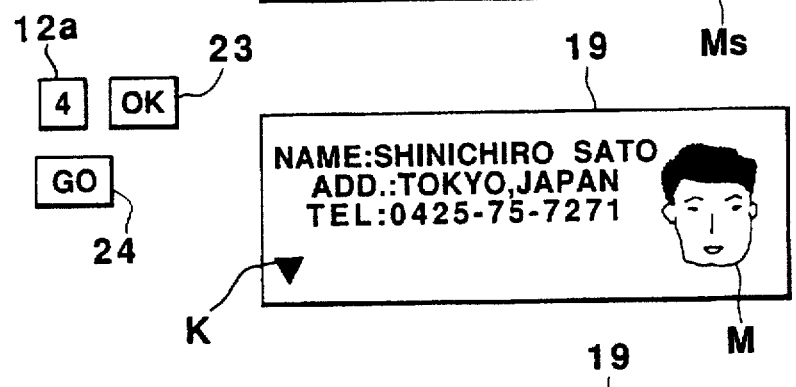
Figure 9D:
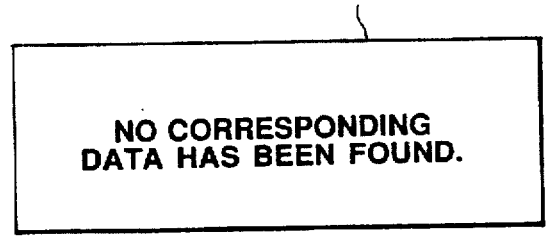

In the manner described above, the part-pattern numbers of respective parts of the montage Ms used for a search are registered to the condition storing unit 15 and the number "4" of the coincident part-pattern data (i.e., the number of the common part-pattern data) included in the montage Ms is set to the number register 27. When the GO key 24 is operated under the conditions as shown in FIG. 9C, all the part-pattern numbers included in the respective montage data stored in the RAM 14 are successively read out to the comparing unit 16, and are compared with the part-pattern numbers included in the montage Ms set to the condition storing unit 15 to be used for a search (steps S22 and S23).

When the comparing unit 16 outputs the coincidence signal, montage data are searched which include not less than 4 coincident part-pattern numbers (four numbers of part data such as a hair style, eye brows, a nose and a mouth) among the part-pattern numbers of the montages Ms set to the condition storing unit 15. Then, all the part-pattern numbers included in the searched montage data are read out from the RAM 14 to the CPU 11, and the part-pattern data corresponding to the read out part-pattern numbers are read out from the part-pattern ROM 13 and combined by the CPU 11 (steps S23 and S24).

The montage M which has been searched under the condition of "the number of the coincident part-pattern numbers of the montage Ms" is displayed together with the relevant personal data previously stored in the RAM 14 on the display unit 19 through the display driver 18 (steps S24 and S14).

If there have been searched a plurality of montages M which include more than three part-pattern numbers common to the montage Ms, an other-candidate cursor K indicates to that effect. In this case, an arbitrary one of the plurality of montages M is selectively displayed by operation of the search data selecting keys 26a and 26b.

On the contrary, when the comparing unit 16 outputs the coincidence signal but there has been searched no montage which include more than three part-pattern numbers common to the montage Ms stored in the condition storing unit 15, then a message of "No corresponding data has been found" which is previously stored in the CPU 11 is displayed on the display unit 20 (steps S23 to S14).

With the structure of the second embodiment, part-pattern data corresponding respectively to portions of the montage of the person to be searched for are selectively read out from the part-pattern ROM 13 by operation of the key input unit 12. The read out part-pattern data are displayed on the display unit 19, thereby the montage of the person to be searched is displayed thereon, and at the same time the part-pattern numbers of the read out part-pattern data are registered in the condition storing unit 15. Meanwhile, the user sets to the number register 27 the number of part-pattern numbers common to the displayed montage and the montage data stored in the RAM 14. When the comparing unit 16 outputs the coincidence signal, the part-pattern data corresponding to the part-pattern numbers included in the montage data which includes not less than the above set number of the coincident part-pattern numbers are read out from the ROM 13 and are combined by the CPU 11 to compose a montage by the CPU 11. Then, the composed montage of the person is displayed on the display unit 19. Simultaneously, the personal data of the person are read out from the RAM 14 based on the displayed montage, and are also displayed on the display unit 19. As described above, even though the user should forget key data of a certain person such as the person's name or address, the data searching apparatus allows the user to easily compose and display a montage of the person using a predetermined number of part-pattern data if the user has in mind an image of a face of the person. As a result, the user can instantly retrieve the personal data corresponding to the displayed montage from among a number of personal data.

THIRD EMBODIMENT

A third embodiment of the data searching apparatus according to the present invention is arranged to visually indicate only a montage of a face which is selected from among a plurality of displayed face montages and meets searching conditions.

Figure 10:
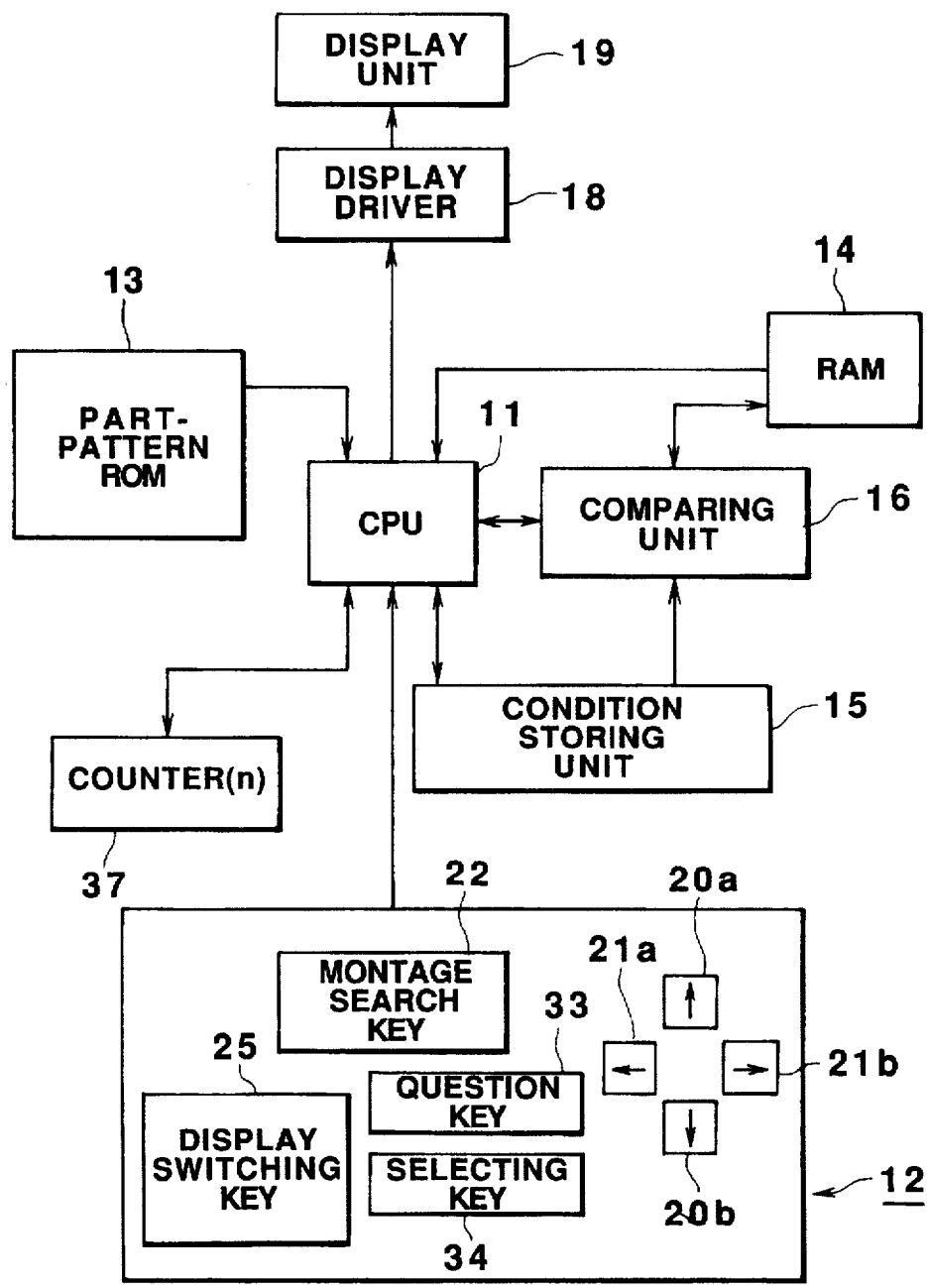
FIG. 10 is a block diagram showing a circuit construction employed in a third embodiment of the present invention.

FIG. 10 is a block diagram of an electronic circuit employed in the third embodiment of the present invention. In the present embodiment, like reference numbers represent like elements of the first embodiment and a further description thereof will be omitted.

The present data searching apparatus is provided with a CPU 11. In a similar way as described above with respect to the first embodiment, the CPU 11 is connected with a key input unit 12, a part-pattern ROM 13, a RAM 14, a condition storing unit 15, a comparing unit 16, a display driver 18 and display unit 19, and is further connected with a counter (n) 37.

The key input unit 12 is provided with character keys (numeral keys 12a, alphabetical keys 12b), a montage composing key 2, and function keys such as cursor keys 20a, 20b, 21a and 21b, a question key 33, a selecting key 34 and a display switching key 25. The cursor keys 20a, 20b, 21a and 21b serve to function as part-pattern selecting keys which are used in a montage composing mode to select a portion of a human face such as a hair style, eyes, a nose and a mouth, and further to select part-pattern data of each portion of the human face. Further, the cursor keys 20a, 20b, 21a and 21b also serve to function as condition setting keys which are used in a montage displaying mode to select items (for example, address, age, and sex) of personal data as searching conditions and further to designate contents of the items (for example, "Tokyo" for the address, "Twenties" for the age and "Male" for the sex) as the searching conditions. The question key 33 is operated when a searching process is executed under the searching conditions. The selecting key 34 is operated to selectively display only the portrait corresponding to the personal data that meets the searching conditions.

The display switching key 25 is used to display personal data in place of the portrait which has been on display.

In a similar manner as described with respect to the first embodiment, at predetermined areas in the part-pattern ROM 13 are stored plural sorts of part-pattern data of each face-part with reference numbers added in a bit map data format. In the present embodiment, "smiling mouth patterns" are stored for respective part-pattern data of "mouth".

In the RAM 14, a plurality of personal data accompanied with corresponding montage data are stored, each of which personal data includes a name, an address, an age, sex, a blood type, hobbies and a phone number, and each of which montage data represents a portrait of the corresponding person.

Area numbers of "0", "1", "2" and so on representative of memory areas in the RAM 14 are provided with condition judging flags F respectively. A number "1" is set for the flag F when personal data meet or coincide with the searching conditions. A number "2" is set for the flag when the personal data do not coincide with the searching conditions. Further, a number "3" is set for the flag when the personal data do not coincide with the searching condition and then erasure is effected by a selecting operation.

In the condition storing unit 15 are stored coded searching conditions specified by operation of the cursor keys 21a, 21b, 22a and 22b when montage data is searched for in a portrait display mode.

To the above counter (n) 37 are set area numbers, "0", "1", "2" and so on of the memory areas in the RAM 14, from which memory area data are read out.

The comparing unit 16 compares a code number of the searching conditions stored in the condition storing unit 15 with a code number of personal data stored at a memory area of the RAM 14 set in the counter (n) 37, when data is searched for in the portrait display node. The comparing unit 16 outputs a coincidence signal to the CPU 11, when both the code numbers coincide with each other.

When the comparing unit 16 outputs the coincidence signal, a flag of an memory area within the RAM 14 is set to "1", at which memory area appropriate personal data is stored. Simultaneously, part-pattern data of "mouth" included in the corresponding montage data is changed from a part-pattern data of "normal mouth" to a part-pattern data of "smiling mouth", and the part-pattern data of "smiling mouth" is displayed.

On the contrary, when the comparing unit 16 outputs a not-coincidence signal, a flag of a memory area within the RAM 14 is set to "2", at which memory area appropriate personal data is stored. Simultaneously, the portrait of the corresponding montage data is controlled to shake its head.

Now, data searching operation of the third embodiment with the structure mentioned above will be described.

Figure 12:
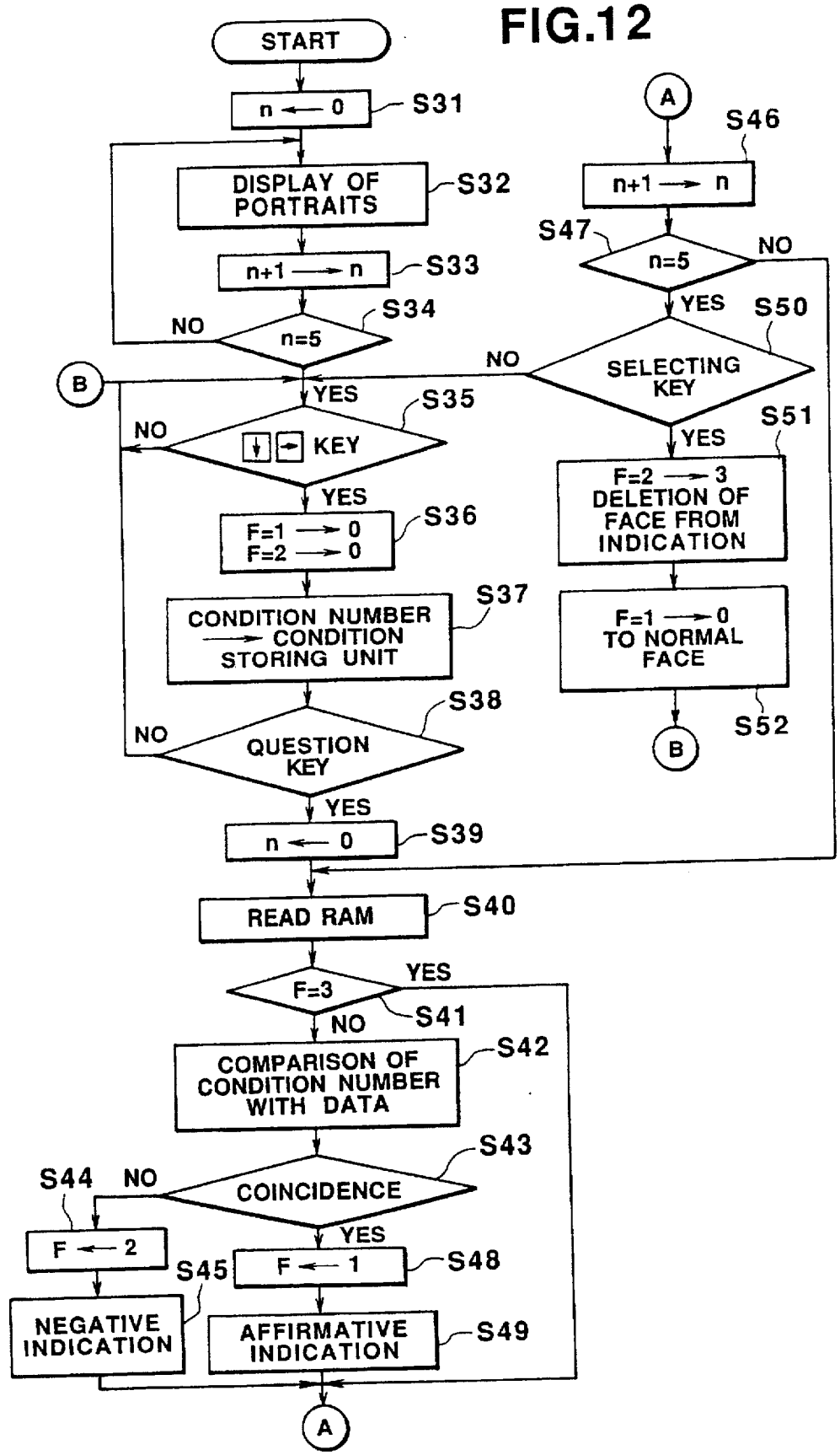
FIG. 12 is a flow chart of a montage searching process of the third embodiment of the present invention.

FIG. 12 is a flow chart of a data searching process in the third embodiment. FIGS. 13 to 15 are views illustrating portraits or montages of faces displayed during the data searching process of the third embodiment.

In the third embodiment, personal data and face-montage data for six persons are previously registered respectively at six memory areas "0", "1", "2" to "5" of the RAM 14.

Figure 13A:
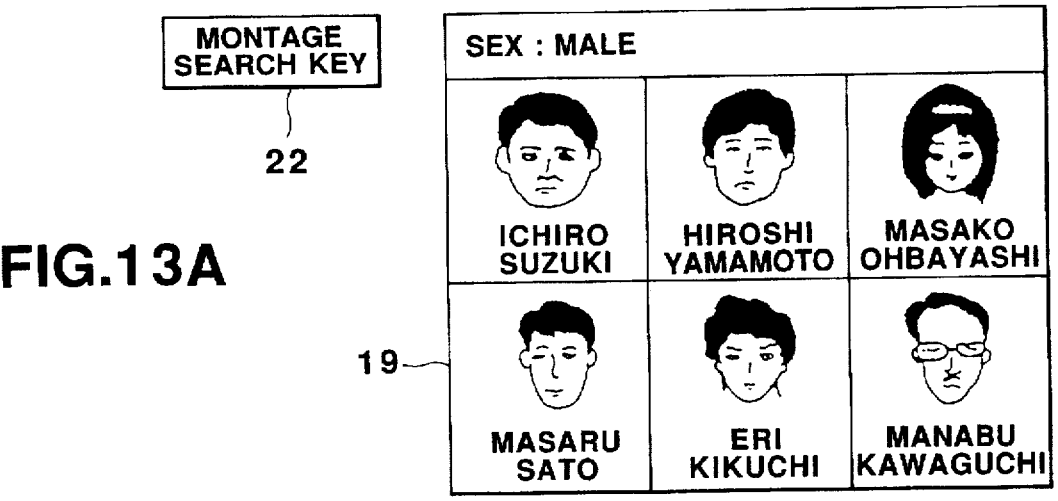
FIGS. 13A to 13C are views illustrating conditions set at the first stage in the montage searching process of FIG. 12 and indications displayed at the first stage in the same process.

When the montage search key 22 of the key input unit 12 is operated, the CPU 11 is set to the portrait display mode. Then, the counter (n) 37 is reset to the initial value "0", which designates one of personal-data memory areas "0", "1", "2" to "5" of the RAM 14 from which personal data is read out (step S31 of the flow chart shown in FIG. 12). Name data "Ichiro Suzuki" included in the personal data and face montage data of the first person which are previously registered at the personal-data memory area "0" designated by the counter (n) 37 are read out to the CPU 11. Part-pattern data composing the face montage data of the first person are read out from the part-pattern ROM 13 and are combined by the display driver 18. As a result, the portrait of the first person accompanied with his name "Ichiro Suzuki" is displayed at a predetermined display area (the left upper area) of the display unit 19, as shown in FIG. 13A (step S32).

After the counter (n) 37 is automatically renewed to "1", it is judged whether the counter (n) 37 reaches "5", i.e., whether portraits of six persons stored in the RAM 14 are simultaneously displayed on the display unit 19 (steps S33, S34).

It is determined that the counter (n) 37 has not reached "5", i.e., it is judged as "NO", because the counter (n) 37 has been set to "1". Therefore, name data "Hiroshi Yamamoto" included in the personal data and face montage data of the second person which are previously registered at the personal-data memory area "1" designated by the counter (n) 37 are read out to the CPU 11. Part-pattern data composing the face montage data of the second person are read out from the part-pattern ROM 13 and are combined by the display driver 18. As a result, the portrait of the second person accompanied with his name "Hiroshi Yamamoto" is displayed at another predetermined display area (the upper middle area) of the display unit 19, as shown in FIG. 13A (steps S34 to S32).

Thereafter, a renewal process for renewing the personal-data memory area of the RAM 14 from which personal data is read out and a composing process for composing read out face montage data are repeatedly executed at steps S32 to S34. Finally, as shown in FIG. 13A are simultaneously displayed the portrait of the third person accompanied with her name "Masako Ohbayashi", the portrait of the fourth person accompanied with his name "Masaru Sato", the portrait of the fifth person accompanied with her name "Eri Kikuchi", the portrait of the sixth person accompanied with his name "Manabu Kawaguchi".

With the names and portraits of six persons simultaneously displayed on the display unit 19, the item of the searching conditions is set to "sex" and content of the item "sex" is set to "male" in the initial setting process for setting the searching conditions.

Figure 13B:
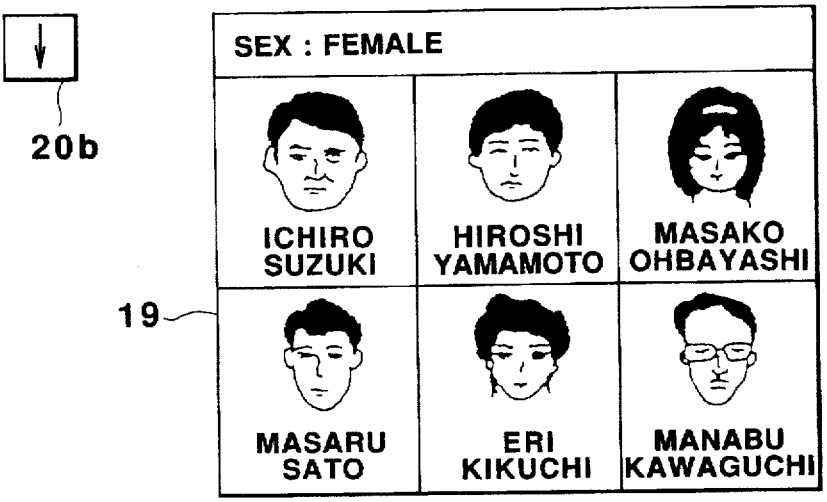

When the cursor key 20b is operated to change the content of the item "sex" with the item "sex" of the searching condition kept unchanged, the searching condition is set to "sex: female" as shown in FIG. 13B (step S35). If the cursor keys 20a, 20b, 21a, 21b which serve to function as condition setting keys should be operated while the above initial setting process is being executed, another searching condition will be set. Accordingly, the flags F set to the personal-data memory areas "0", "1" to "5" of the RAM 14 are reset to "0", as long as F=1 and F=2 are not excluded from an indication on the display unit 19 (step S36).

The code number corresponding to the searching condition of "sex: female" displayed on the display unit 19 is set to the condition storing unit 15, and the CPU 11 waits for operation of the question key 33 to instruct to start a searching operation (steps S37 and S38).

In other words, the operation of the cursor keys 20a, 20b, 21a and 21b, the flag resetting process and condition setting process are repeatedly executed at steps S35 to S38, whereby an arbitrary searching condition is decided with respect the previously stored personal data.

With the above searching condition of "sex: female" set in the condition storing unit 15, when the question key 33 is operated, the counter (n) 37 is reset to "0" and the personal-data memory area of the RAM 14 for the first person is designated as a memory area from which data is read out, thereby the personal data (a name, an address, an age, sex and so on) are successively read out (steps S38 to S39 and S40).

It is judged whether the flag of the personal-data memory area "0" from which the personal data are being read out is set to "3", i.e., whether the memory area is excluded from the indication on the display unit 19 under the searching condition. When it is confirmed that F=0, 1 or 2 is true, i.e., when it is confirmed that the flag is not excluded from the indication on the display unit 19, the comparing unit 16 compares a code number included in personal data of the first person which have been read out at step S40 with the code number corresponding to the searching condition of "sex: female" which has been written into the condition storing unit 15 at step S37 (steps S41 to S42).

Figure 13C:
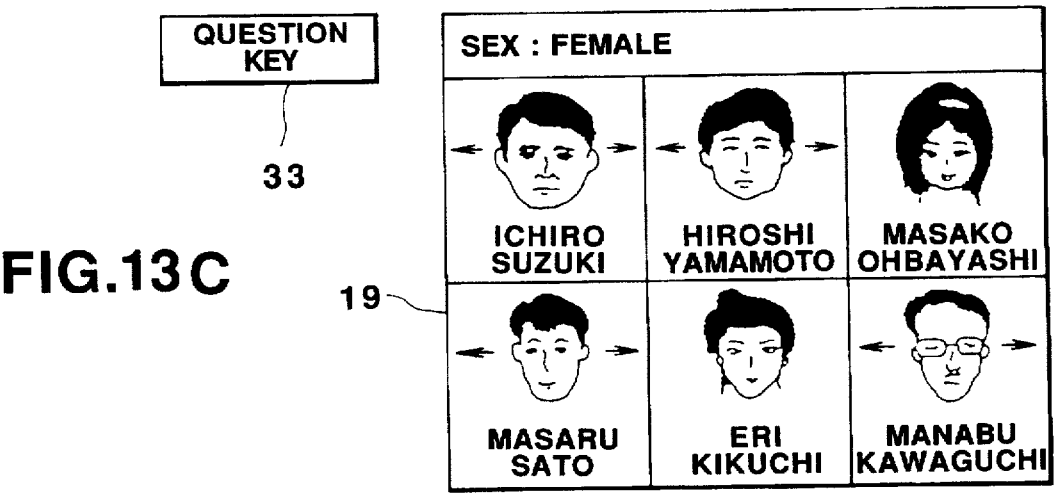

In this case, the comparing unit 16 determines that the searching condition of "sex: female" does not coincide with the condition of the first person, because the item "sex" of the personal data of the first person "Ichiro Suzuki" is "male". Then, the flag of the pertinent personal-data memory area "0" is set to "2", which shows that the data does not meets the searching condition. Therefore, the portrait of the first person displayed on the display unit 19 is controlled to shake the head, as shown in FIG. 13C, thereby visually indicating that the first person does not satisfy the searching condition (steps S43 to S44, S45).

Then, the counter (n) 37 is renewed to "1", and it is judged whether the counter (n) 37 has reached "5", i.e., it is judged whether a condition searching process with respect to personal data of the sixth person has been finished steps S46, S47).

In this case, it is determined "NO", as a value of the counter (n) 37 is "1"(n=1). Since the value of the counter (n) 37 is "1"(n=1), the personal data of the second person stored in the personal-data memory area "1" is read out. After it is confirmed that the flag is not "3", the code number of the second person is compared by the comparing unit 16 with the code number of the searching condition of "sex: female" written in the condition storing unit 15 (steps S47 to S40, S41).

Since the content of the item "sex" of the personal data of the second person "Hiroshi Yamamoto" is "male", the comparing unit 16 determines that the personal data of the second person does not satisfy the searching condition of "sex: male", and the flag of the personal-data memory area of the RAM 14 "1" is set to "2", which shows that the personal data does not meets the searching condition. Therefore, the portrait of the second person displayed on the display unit 19 is controlled to shake the head, as shown in FIG. 13C, thereby visually indicating that the second person does not meet the searching condition (steps S43 to S44, S45). At step S44, the value of the counter (n) 37 is renewed to "2", and the personal data of the third person, "Masako Ohbayashi" is read out from the personal-data memory area "2" of the RAM 14 designated by the counter (n) 37. At steps S42 and S43, the comparing unit 16 confirms that the personal data of the third person satisfies the searching condition of "sex: female" written into the condition storing unit 16, and the flag of the pertinent personal-data memory area "2" is set to "1", which shows that the third person meets the searching condition. Then, the part-pattern data of a "normal mouth pattern" of the portrait of third person "Masako Ohbayashi" displayed on the display unit 19 is changed to the part-pattern data of a "smiling mouth pattern" as shown in FIG. 13C, thereby visually indicating that the third person meets the searching condition (steps S43 to S48, S49).

Thereafter, processes at steps S40 to S49 are repeatedly executed, whereby a condition judging process is performed with respect to personal data read out from the personal-data memory areas "3", "4" and "5" in the similar manner as described above. As a result, the flags F of the personal-data memory areas "3" and "5" corresponding respectively to the fourth person "Masaru Sato" and the sixth person "Manabu Kawaguchi" are set to "2", which indicates these personal data do not meet the searching condition. Similarly, the pertinent portraits are controlled to shake the heads, thereby visually indicating that the personal data do not satisfy the searching condition.

Meanwhile, the flag F of the personal-data memory area "4" corresponding to the fourth person "Eri Kikuchi" is set to "1", which shows the personal data meets the searching condition, and the pertinent part-pattern data of a "normal mouth pattern" is changed to that of a "smiling pattern", thereby visually indicating that the personal data of the fourth person meets the searching condition.

As described above, when the question key 33 is operated with the searching condition of "sex: female" registered and with six portraits being simultaneously displayed on the display unit 19, the portraits, the personal data of which meet the searching condition of "sex: male", are controlled to shake the heads, thereby demonstrating to the user that the personal data do not meet the registered searching condition, and the portraits, the personal data of which meet the searching condition of "sex: female", are changed to smiling portraits, thereby demonstrating to the user that the personal data meet the registered searching condition.

When the selecting key 34 is operated with the six personal data subjected to the searching process under the searching condition of "sex: female"(a first searching condition) as described above, the portraits, the flags F of the personal-data memory areas of which portraits are set to "2", are deleted from the indication on the display unit 19. That is, from the indication of the display unit 19 are deleted the portraits of the first person "Ichiro Suzuki", the second person "Hiroshi Yamamoto", the fourth person "Masaru Sato" and the sixth person "Manabu Kawaguchi". Therefore, the corresponding flags are set to "3", which indicates the pertinent portrait is to be deleted from the indication on the display unit 19 (steps S50 to S51).

Figure 14A:
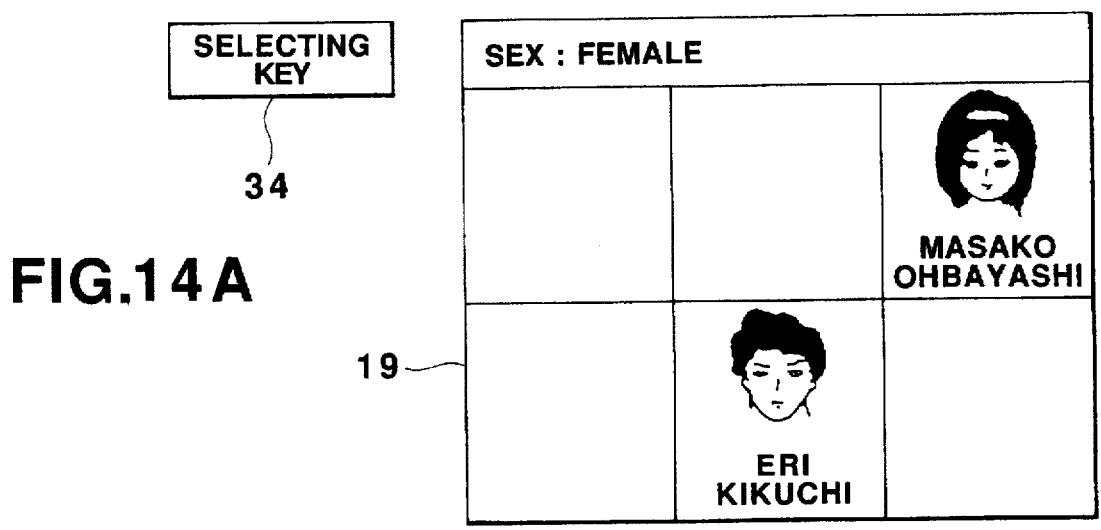
FIGS. 14A to 14C are views illustrating conditions set at the second stage in the montage searching process of FIG. 12 and indications displayed at the second stage in the same process.

The flag F (in this case, F=1) of the personal-data memory area (in this case, areas "2" and "4"), the personal data of which meets the searching condition, is reset to "0". The part-pattern data of a "smiling mouth pattern" of the pertinent portraits are changed to the original part-pattern data, i.e., the part-pattern data of a "normal mouth pattern", as shown in FIG. 14A (step S52).

Now, only the portraits of the personal data which meet the first searching condition of "sex: female" are left displayed on the display unit 19 out of the six portraits previously registered in the RAM 14 and displayed on the display unit 19.

Figure 14B:
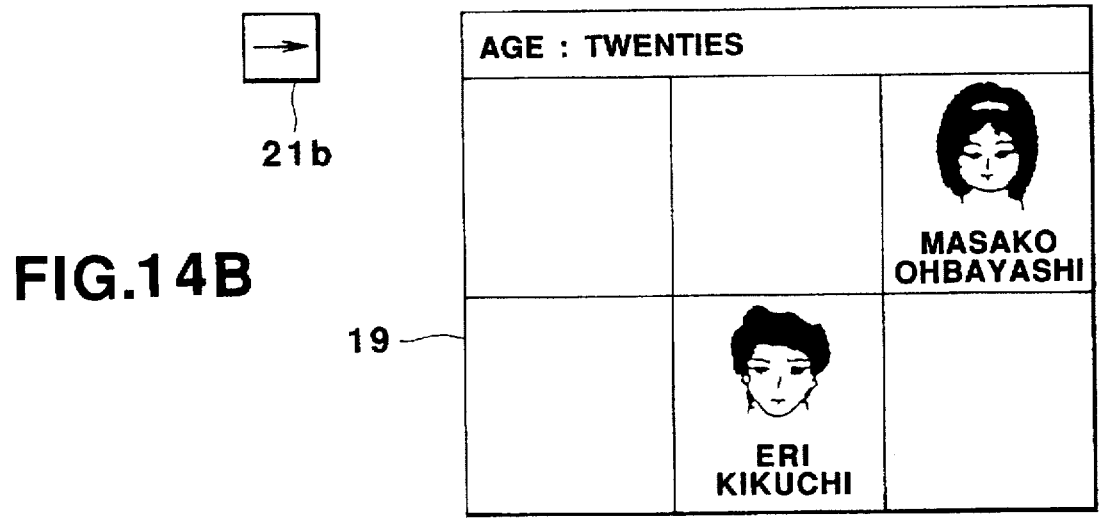
Figure 14C:
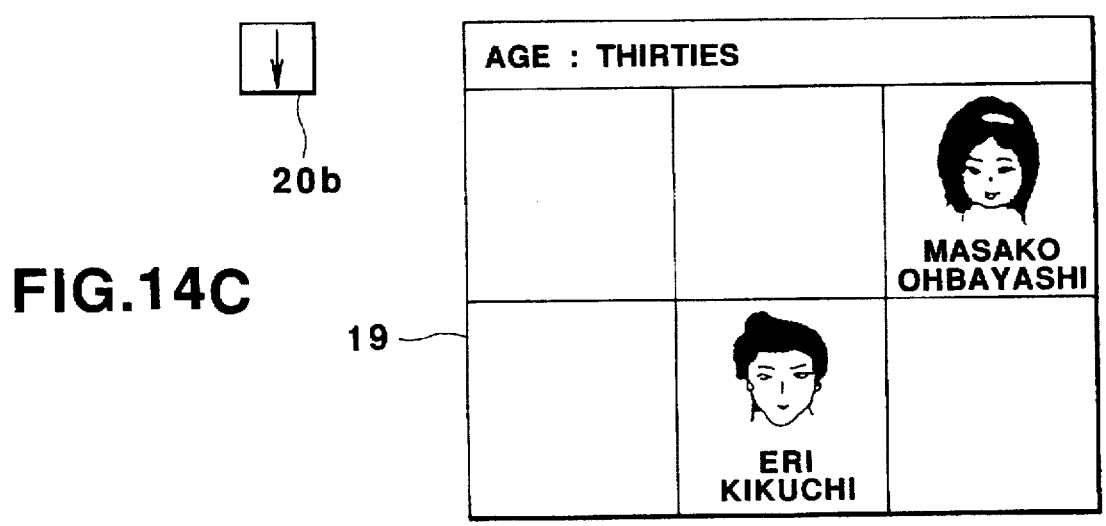

When the cursor key 21b is operated with the two female portraits displayed on the display unit 19, an "age" is selected as an item of the second searching condition, and further the content of the item "age" is initially set to "twenties", as shown in FIG. 14B. When the cursor key 20b is operated, the content of the item "age" is changed to "thirties" with the item "age" of the second searching condition kept unchanged, and the second searching condition of "age: thirties" is displayed, as shown in FIG. 14C (step S35).

If the cursor keys 20a, 20b, 21a, 21b which serve to function as condition setting keys are operated while the above setting process is being executed, another searching conditions will be set. Accordingly, the flags F set to the personal-data memory areas "0", "1" to "5" of the RAM 14 are reset to "0", as long as F=1 and F=2 are not excluded from an indication on the display unit 19 (step S36).

The flags at the personal-data memory areas "2" and "4" for the third and fifth persons, "Masako Ohbayashi" and "Eri Kikuchi", whose portraits are now displayed, are already reset to "0" at step S52.

The code number corresponding to the second searching condition of "age: thirties" displayed on the display unit 19 is registered to the condition storing unit 15, and the CPU 11 waits for another operation of the question key 33 (steps S37 and S38).

With the second searching condition of "age: thirties" registered in the condition storing unit 15, when the question key 33 is operated, the counter (n) 37 is reset to "0" and the personal-data memory area of the RAM 14 for the first person is designated as a memory area from which data is read out, thereby the personal data (a name, an address, an age, sex and so on) are successively read out (steps S38 to S39 and S40).

Since the flag F at the personal-data memory area "0", from which data are being read out, has been set to "3" at step S51, it is determined that the corresponding portrait was excluded from the indication on the display unit 19 under the above first searching condition, and the value of the counter (n) 37 is renewed to "1".

Then, personal data (a name, an address, an age, sex and so on) of the second person are successively read out from the personal-data memory area "1" of the RAM 14 (steps S41 to S46, steps S47 to S40).

The flag F at the personal-data memory area "1" was set to "3" at step S51, and it is determined that the corresponding portrait was excluded from the indication on the display unit 19 under the above first searching condition. The value of the counter (n) 37 is also renewed to "2". Then, personal data (a name, an address, an age, sex and so on) of the third person are successively read out from the personal-data memory area "2" of the RAM 14 (steps S41 to S46, steps S47 to S40).

Since the flag F at the personal-data memory area for the third person "Masako Ohbayashi" has been reset to "0", the result of judgement at step S41 is "NO". At step S43, the comparing unit 16 compares the code numbers of the personal data of the third person read out from the personal-data memory area "2" with the code number corresponding to the second searching condition of "age: thirties", which has been written into the condition storing unit 15 at step 37 (steps S41 to S43).

Figure 15A:
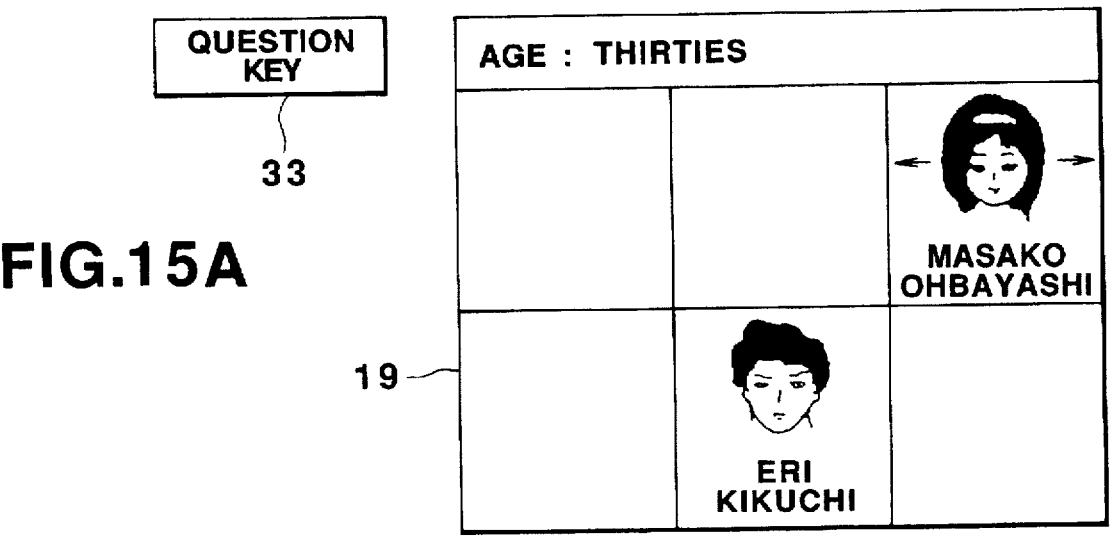
FIGS. 15A and 15B are views illustrating conditions set at the third stage in the montage searching process of FIG. 12 and indications displayed at the third stage in the same process.

The content of the item "age" of the personal data of the third person "Masako Ohbayashi" is "28", and the comparing unit 16 therefore determines that the personal data of "Masako Ohbayashi" does not meet the second searching condition of "age: thirties". Then, the flag F of the pertinent personal-data memory area "2" is set to "2", which indicates the personal data does not meet the searching condition, and the portrait of the third person displayed on the display unit 19 is controlled to shake the head as shown in FIG. 15A, thereby visually advising that the personal data does not meet the searching condition (steps S43 to S44, S45).

Then, the value of the counter (n) 37 is renewed to "3", and personal data (a name, an address, an age, sex and so on) of the fourth person are read out from the personal-data memory area "3"(steps S46, S47 to S40).

The flag F at the personal-data memory area "3" has been set to "3" at step S51, and it is determined that the corresponding portrait was excluded from the indication on the display unit 19 under the above first searching condition. The value of the counter (n) 37 is then renewed to "4". Then, personal data (a name, an address, an age, sex and so on) of the fifth person are successively read out from the personal-data memory area "4" of the RAM 14 (steps S41 to S46, steps S47 to S40).

Since the flag F at the personal-data memory area for the fifth person "Eri Kikuchi" has been reset to "0", the result of judgement at step S41 is "NO". At step S43, the comparing unit 16 compares the code numbers of the personal data of the fifth person read out from the personal-data memory area "4" with the code number corresponding to the second searching condition of "age: thirties", which has been written into the condition storing unit 15 at step 37 (steps S41 to S42).

When the comparing unit 16 determines that the code number of the searching condition of "age: thirties" written into the condition storing unit 15 coincides with the code number of the age item of the personal data of the fifth person, which is read out from the personal-data memory area "4" at step S40, the flag F at the pertinent personal-data memory area "4" is set to "1", which indicates the personal data meets the searching condition. In the portrait of the fifth person "Eri Kikuchi" displayed on the display unit 19, the part-pattern data of a "normal mouth pattern" is changed to that of a "smiling mouth pattern" as shown in FIG. 15A, thereby visually indicating that the personal data satisfies the searching condition (steps S43 to S48, S49).

Then, the value of the counter (n) 37 is renewed to "5", and personal data (a name, an address, an age, sex and so on) of the sixth person are read out from the personal-data memory area "5"(steps S46, S47 to S40).

The flag F at the personal-data memory area "5" has been set to "3" at step S51, and it is determined that the corresponding portrait was excluded from the indication on the display unit 19 under the above first searching condition. The value of the counter (n) 37 is then renewed to "6", and the CPU 11 waits for another operation of the selecting key 34 (steps S41 to S46, steps S47 to S50).

When the question key 33 is operated with the second searching condition of "age: thirties" registered and with two portraits (third and fifth persons) being simultaneously displayed on the display unit 19, the portrait, the personal data of which does not meet the searching condition of "age: thirties", is controlled to shake the head, thereby demonstrating to the user that the personal data does not meet the registered searching condition, and the portrait, the personal data of which meet the searching condition of "age: thirties", is changed to smiling portraits, thereby demonstrating to the user that the personal data meet the registered searching condition.

When the selecting key 34 is operated with the six personal data subjected to the searching process under the first searching condition of "sex: female" and second searching condition of "age: thirties", the portrait, the flag F of the personal-data memory areas of which portrait is set to "2", is deleted from the indication on the display unit 19. That is, the portrait of the third person "Masako Ohbayashi" is deleted from the indication of the display unit 19. Therefore, the corresponding flag is set to "3", which indicates the pertinent portrait is to be deleted from the indication on the display unit 19 (steps S50 to S51).

Figure 15B:
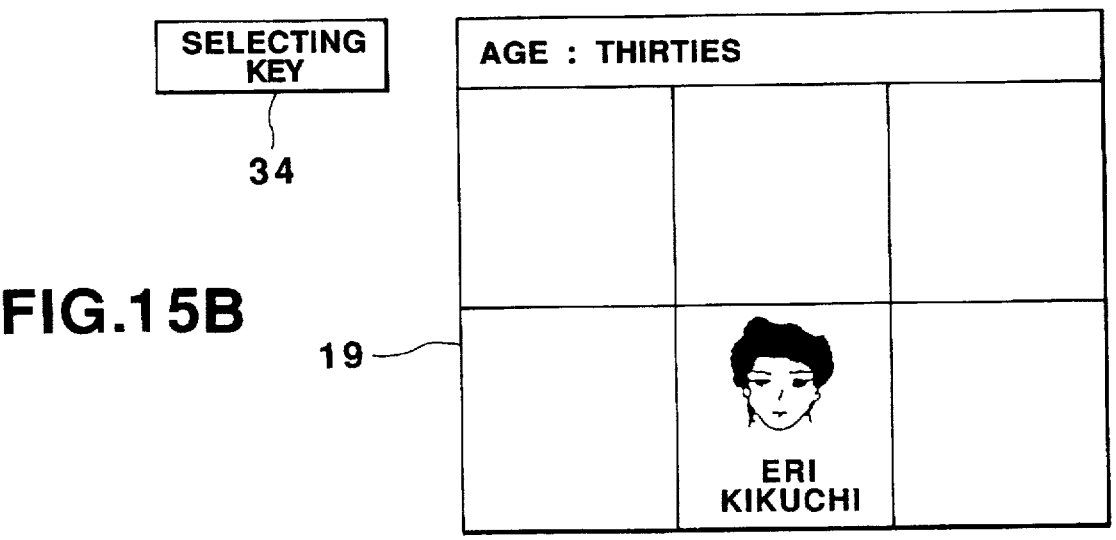

The flag F (in this case, F=1) of the personal-data memory area (in this case, the area "4"), the personal data of which meets the searching condition, is reset to "0". The part-pattern data of a "smiling mouth pattern" of the pertinent portraits are changed to the original part-pattern data, i.e., the part-pattern data of a "normal mouth pattern", as shown in FIG. 15B (step S52).

As described above, only the portrait, the personal data of which meets the first searching condition of "sex: female" and the second searching condition of "age: thirties" is left displayed on the display unit 19 among the six portraits registered in the RAM 14.

To confirm the personal data of the fifth person "Eri Kikuchi" which meet the first and second searching conditions, the display switching key 25 is operated. Then, the personal data (an address, an age, sex, a blood type and son on) are successively read out from the personal-data memory area "4" of the RAM 14, and are displayed on the display unit 19 in place of the displayed portrait or together with the portrait.

In the third embodiment with the above structure, when the montage search key 22 is operated, the personal data for six persons previously registered respectively to the personal-data memory areas "0", "1" to "5" are read out and the portraits of the six persons are simultaneously displayed on the display unit 19 based on the read out personal data. The comparing unit 16 judges in response to operation of the question key 33 whether the personal data of the respective displayed portraits coincide with the searching condition set by operation of the cursor keys 20a, 20b, 21a and 21b and stored in the condition storing unit 15. Depending on the result of the judgement, each of the portraits displayed on the display unit 19 is changed to either of a smiling portrait which indicating the personal data meets the searching condition or a portrait shaking the head which indicating the personal data does not meet the searching condition. In this manner, portraits among those displayed on the display unit 19, which portraits do not meet plural searching conditions, are deleted from the indication on the display unit 19 one by one, thereby the portrait which meets the plural searching conditions is left displayed on the display unit 19.

In the present embodiment, the portrait which meets the searching condition is changed to the smiling portrait and the portrait which does not meet the searching condition is changed to a portrait shaking the head. But the portrait may be changed to either of a laughing portrait or an regretful portrait. Further, the portrait may be changed to a montage waving the hand or a montage facing back.

Further in the present embodiment, the portrait which does not meet the searching condition is deleted from the indication on the display unit 19 by operation of the selection key 34, and other portraits remain displayed at the original positions on the display unit 19. But the remaining portraits may be displayed at another proper positions on the display unit 19.

The present embodiment has been described with personal data of the six persons registered in the RAM 14 but the number of the registered personal data is not limited to six. Personal data of more than six persons may be registered in the RAM 14.

OTHER EMBODIMENT

In the above first and second embodiments, a plurality of montage data, each of which is comprised of a combined data including plural part-pattern data, are previously prepared and registered in the memory unit. One or plural montage data among the plurality of montage data are searched for with respect to the part-pattern data included therein and displayed on the display unit. In place of montage of human faces, montage of animal faces or imaginary creatures may be displayed.

Several embodiments of the present invention have been described in detail but these embodiments are simply illustrative and not restrictive. The present invention may be modified in various manners. All the modifications and applications of the present invention will be within the scope and spirit of the invention, so that the scope of the present invention should be determined only by what is recited in the present appended claims and their equivalents.

What is claimed is:

1. A face image searching apparatus for searching through a plurality of face images each composed of different part images arranged at predetermined different positions for at least one face image, said apparatus comprising:

part image storing means which contains a plurality of groups of part images, one group for each of the different parts which compose a face image, and a plurality of designating data each for designating a corresponding part image, the respective designating data being stored along with the corresponding part images in corresponding relationship;

part image selecting means for selecting a plurality of part images one for each of the parts which compose the face from among the plurality of groups of part images stored in said part image storing means;

face image composing means for disposing the plurality of part images selected by said part image selecting means at predetermined positions of the respective parts which compose the face to compose a face image for retrieval use;

face image storing means for storing a plurality of face images each composed by said face image composing means;

first designating data storing means for reading from said part image storing means and storing designating data for designating the respective part images of each of the face images of the plurality of face images stored in said face image storing means;

operable means operated for displaying a part image for retrieval use;

part image display means, responsive to said operable means being sequentially operated, for sequentially selecting and displaying part images one by one from among the plurality of groups of part images stored in said part image storing means, and displaying the name of the selected displayed part image simultaneously;

part image designating means for designating any part image from among the part images displayed by said part image display means;

second designating data storing means for storing designating data corresponding to the part image designated by said part image designating means;

retrieval start designating means for starting the start of retrieval of a face image; coincidence determining means responsive to said retrieval start designating means designating the start of retrieval of a face image, for determining whether the designating data stored in said second designating data storing means coincides with any one of the designating data stored in said first designating data storing means;

reading means, responsive to a determination by said coincidence determining means that the designating data stored in said second designating data storing means coincides with any one of the designating data stored in said first designating data storing means, for reading out a face image including a part image corresponding to the coinciding designating data from among the plurality of face images for retrieval use stored in said face image storing means;

face display means for displaying the face image read by said reading means inputting means for inputting character data for the respective face images stored in said face image storing means; and character data storing means for storing the character data input by said inputting means;

wherein in response to a determination by said coincidence count determining means that the designating data stored in said second designating data storing means coincides with any one of the designating data stored in said first designating data storing means, said reading means reads out a face image including the part image corresponding to the coinciding designating data from among the plurality of face images stored in said face image storing means, and reads out character data corresponding to the read-out face image from said character data storing means; and wherein said display means displays the read face image and the corresponding character data.

* * * * *